(12) United States Patent
Xu

(10) Patent No.: US 8,235,362 B2
(45) Date of Patent: Aug. 7, 2012

(54) FLUID DISTRIBUTION TO PARALLEL FLOW VAPOR-LIQUID CONTACTING TRAYS

(75) Inventor: Zhanping Xu, East Amherst, NY (US)

(73) Assignee: UOP LLC, Des Plaines, IL (US)

( * ) Notice: Subject to any disclaimer, the term of this patent is extended or adjusted under 35 U.S.C. 154(b) by 612 days.

(21) Appl. No.: 12/415,327

(22) Filed: Mar. 31, 2009

(65) Prior Publication Data

US 2010/0244290 A1    Sep. 30, 2010

(51) Int. Cl.
*B01F 3/04* (2006.01)
(52) U.S. Cl. ......................... 261/97; 261/114.1
(58) Field of Classification Search ............ 261/97, 261/110, 114.1, 114.3, 114.5
See application file for complete search history.

(56) References Cited

U.S. PATENT DOCUMENTS

| | | | | |
|---|---|---|---|---|
| 3,158,171 A * | 11/1964 | Eckert | 137/262 |
| 4,101,610 A | 7/1978 | Kirkpatrick et al. | 261/110 |
| 4,174,363 A | 11/1979 | Bruckert | 261/114 |
| 4,264,538 A * | 4/1981 | Moore et al. | 261/97 |
| 4,267,978 A * | 5/1981 | Manteufel | 239/193 |
| 4,472,325 A * | 9/1984 | Robbins | 261/96 |
| 4,476,069 A * | 10/1984 | Harper et al. | 261/97 |
| 4,557,877 A * | 12/1985 | Hofstetter | 261/97 |
| 4,648,972 A * | 3/1987 | Ullrich et al. | 210/541 |
| 5,223,183 A | 6/1993 | Monkelbaan et al. | 261/114.1 |
| 5,244,604 A * | 9/1993 | Miller et al. | 261/97 |
| 5,968,312 A | 10/1999 | Sephton | 159/47.1 |
| 7,150,994 B2 | 12/2006 | Bergh et al. | 436/37 |
| 7,204,477 B2 | 4/2007 | Xu et al. | 261/114.1 |
| 8,052,126 B2 * | 11/2011 | Xu et al. | 261/110 |
| 2003/0193099 A1 * | 10/2003 | Xu et al. | 261/114.1 |
| 2007/0137482 A1 * | 6/2007 | Xu et al. | 95/198 |

OTHER PUBLICATIONS

Haselden, G.G. "Scope for improving fractionation equipment," Source: *Chemical Engineer* (London), n 299-300,Jul.-Aug. 1975, p. 439-441,445.

Azzopardi, B.J. "The effect of a plate axial to the flow on the liquid distribution in annular two-phase flow," (University of Nottingham) Source: *Nuclear Engineering and Design*, v 152, n 1-3, Nov. 3, 1994, p. 257-262.

* cited by examiner

*Primary Examiner* — Charles Bushey
(74) *Attorney, Agent, or Firm* — Mark R Willis

(57) ABSTRACT

Fluid distribution systems, and particularly those for distributing liquids into apparatuses containing parallel flow trays for carrying out vapor-liquid contacting, are described. Representative fluid distribution systems comprise one or more extended troughs having a plurality of outlet spouts that are aligned for distribution to a vapor-liquid contacting deck zones of a parallel flow stage. The trough(s) may be orthogonal to liquid distribution pans which are in alignment with outlet spouts (e.g., in discrete outlet spout zones) of the trough (s).

19 Claims, 5 Drawing Sheets

FLUID DISTRIBUTION TO PARALLEL FLOW VAPOR-LIQUID CONTACTING TRAYS

FIELD OF THE INVENTION

The invention relates to contacting apparatuses for performing vapor-liquid contacting such as in fractional distillation or other mass and/or heat transfer operations. The invention more specifically relates to systems for distributing fluid such as liquid to parallel contacting stages used to provide high capacity, high efficiency contacting.

DESCRIPTION OF RELATED ART

Vapor-liquid contacting devices, such as fractionation trays and packings, are employed to perform a wide variety of separations, particularly in the petroleum and petrochemical industries. Fractionation trays, for example, are used for separating hydrocarbons into fractions having a similar relative volatility or boiling point. These fractions include crude oil-derived products of petroleum refining and petrochemical processing, such as naphtha, diesel fuel, liquefied petroleum gas, and polymers. In some cases, trays are used to separate specific compounds from others of the same chemical or functional class, for example alcohols, ethers, alkylaromatics, monomers, solvents, inorganic compounds, etc. Trays are also used in gas processing and absorptive separation operations. A wide variety of trays and other contacting devices having differing advantages and drawbacks have been developed.

Fractionation trays and packings are the predominant forms of conventional vapor-liquid contacting devices used in distillation apparatuses, for example, in the applications described above. In the case of trays, a typical fractionation column will utilize about 10 to 250 of these contacting devices, depending on the ease of the separation (relative volatility difference) and desired product purity. Often the structure of each tray in the column is similar, but it is also known that the structures may differ (e.g., alternate) with respect to vertically adjacent trays. Trays are mounted horizontally, normally at a uniform vertical distance referred to as the tray spacing of the column. This distance may, however, vary in different sections of the column. The trays are often supported by rings welded to the inner surface of the column wall.

Fractional distillation has traditionally been conducted in cross flow or counter current contacting devices having an overall downward liquid flow and upward vapor flow. At various points or stages in the apparatus the vapor and liquid phases are brought into contact to allow the vapor and liquid phases to exchange components and achieve, or approach as closely as possible, vapor-liquid equilibrium with each other. The vapor and liquid are then separated, moved in their respective directions, and contacted again with another quantity of the appropriate fluid at a different stage. In many conventional vapor-liquid contacting devices, vapor and liquid are contacted in a cross flow arrangement at each stage. An alternative apparatus differs in its operation from traditional, multi-stage contacting in that while the overall flow in the apparatus continues to be countercurrent, each stage of actual contacting between the liquid and vapor phases is at least partially performed in a co-current mass transfer zone. Devices for providing cross flow or co-current vapor-liquid contacting, as well as devices that route vapor and liquid flows in other arrangements at contacting stages, are known.

During fractional distillation processes using conventional trays, vapor generated at the bottom of the column rises through a large number of small perforations spread over the decking area of the tray, which supports a quantity of liquid and which may be divided into discrete regions and/or zones. The passage of the vapor through the liquid generates a layer of bubbles referred to as froth. The high surface area of the froth helps to establish a compositional equilibrium between the vapor and liquid phases on the tray. The froth is then allowed to separate into vapor and liquid. During vapor-liquid contacting, the vapor loses less volatile material to the liquid and thus becomes slightly more volatile as it passes upward through each tray. Simultaneously the concentration of less volatile compounds in the liquid increases as the liquid moves downward from tray to tray. The liquid separates from the froth and travels downward to the next lower tray. This continuous froth formation and vapor-liquid separation is performed on each tray. Vapor-liquid contacting devices therefore perform the two functions of contacting the rising vapor with liquid and then allowing the two phases to separate and flow in different directions. When the steps are performed a suitable number of times on different trays, multiple equilibrium stages of separation can be achieved, leading to the effective separation of chemical compounds based upon their relative volatility.

Many different types of vapor-liquid contacting devices including packings and trays have been developed in an effort to improve such separations. Different devices tend to have different advantages. For instance, multiple downcomer trays have high vapor and liquid capacities and the ability to function effectively over a significant range of operating rates. Structured packings tend to have a low pressure drop, making them useful in low pressure or vacuum operations.

Two important parameters used to evaluate the performance of any vapor-liquid contacting device such as a fractionation tray are capacity and efficiency. Capacity refers to the total amount of vapor and liquid that can be effectively contacted on, and passed to, successive trays without flooding. Efficiency refers to the effectiveness, or approach to equilibrium, of mass transfer between vapor and liquid phases, occurring from tray to tray. Both capacity and efficiency may be compromised if maldistribution of liquid or vapor occurs in a vapor-liquid contacting apparatus. Maldistribution of liquid or vapor has a tendency to propagate from one tray to the next, reducing the performance of the apparatus as a whole.

In a well-known classic study by W. K. Lewis in 1936, it was found that the mass transfer efficiency of vapor-liquid contacting trays could be maximized by bringing an unmixed vapor into contact with liquid flows across each successive tray in the same direction (Case 2). The Case 2 is referred to as a parallel flow, which, as used herein, refers to liquid flows on vertical adjacent or successive trays rather than to liquid flows on a single tray. Lewis' Case 2 ensures that the driving force for mass transfer on a given tray is nearly the same regardless of where that mass transfer occurs on the tray. Because of this, substantial increases in efficiency can be obtained when using a tray operated according to Lewis' Case 2.

Contacting stages for vapor-liquid contacting apparatuses that utilize parallel flow trays are known in the art and described, for example, in U.S. Pat. No. 5,223,183, which is directed to a parallel flow tray with at least one central downcomer and no side downcomers. Another such contacting stage is described in U.S. Pat. No. 5,318,732, which utilizes multiple downcomers and incorporates tray features to increase capacity. An improved high-capacity parallel flow tray is described in U.S. Pat. No. 7,204,477, hereby incorporated by reference in its entirety.

The parallel flow trays described above, as well as other trays and vapor-liquid contacting apparatuses using these trays, require effective distribution of fluids including feeds that may be introduced at various levels of the apparatuses, and consequently at various positions with respect to a plurality of vertically spaced trays. For example, a feed to a distillation column may be introduced above a top tray as a liquid reflux stream or otherwise introduced between trays in a middle section of the apparatus as a middle feed having both vapor and liquid components or fractions. In the case of apparatuses with stages employing parallel flow trays, the manner in which fluid (e.g., a liquid feed) is introduced above a given tray has a significant impact on the overall performance of the apparatus. In particular, each stage of a high capacity, high efficiency contacting apparatus may have 4, 6, 8, or more individual vapor-liquid contacting zones of upward vapor flow through liquid flowing horizontally across a contacting deck zone to a liquid downcomer. The optimal delivery of fluid to each contacting zone of a parallel flow tray therefore represents an important challenge that has prompted continuing efforts to seek improvements.

SUMMARY OF THE INVENTION

The present invention is associated with the discovery of improved distribution systems for liquid feeds and other fluids into a vapor-liquid contacting apparatus, for example from an inlet external to the apparatus (e.g., an external liquid feed inlet). The distribution systems are especially applicable for the delivery of fluids to contacting stages comprising parallel flow trays (i.e., parallel flow tray contacting stages) in which liquid falling through downcomers of an adjacent, higher stage must flow across a vapor-liquid contacting deck zone of the immediately lower parallel tray contacting stage to a different liquid downcomer, which is not in vertical alignment with the liquid downcomer used to flow liquid from the adjacent, higher stage. The contacting deck zones are perforated to allow the passage of rising vapor and formation of froth on the tray that aids in the vapor-liquid contacting and approach to compositional equilibrium between the phases. Parallel flow trays of particular interest, for use with these distribution systems, are described in U.S. Pat. No. 7,204,477.

An important consideration of the distribution systems is the ability to deliver fluids, such as liquid feeds (optionally together with a vapor fraction), optimally to each contacting deck zone of a parallel flow tray immediately below. Especially desired in the case of incoming liquid feed streams, for example, is the ability to distribute the liquid in proportion to the contact area of each contacting deck zone. In addition, liquid should be ideally well distributed over inlet areas of these contacting deck zones, such that the liquid feed delivered to a parallel flow tray must flow (e.g., as froth) substantially over the deck zones and thereby engage in significant contact with vapor rising through perforations in the deck zones. This objective becomes increasingly more difficult with the size of the vapor-liquid contacting apparatus (e.g., a distillation column), which impacts not only the number of contacting deck zones but also the number of different areas of deck zones to which liquid must be distributed.

These and other embodiments relating to the present invention are apparent from the following Detailed Description.

Figure 1:
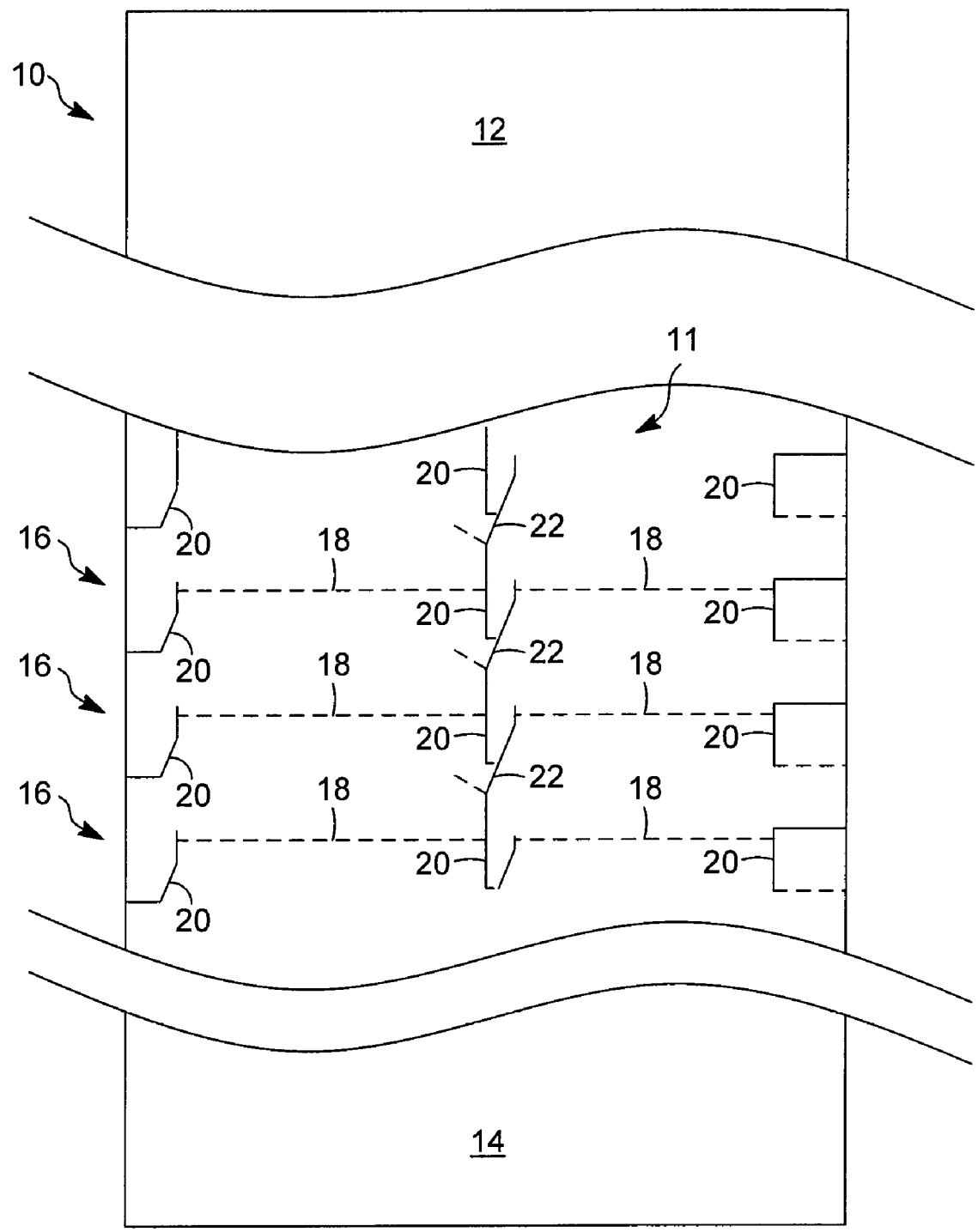
FIG. 1 is a cross-sectional schematic of a representative apparatus comprising contacting stages with parallel flow contacting trays.

The same reference numbers are used to illustrate the same or similar features throughout the drawings. The drawings are to be understood to present an illustration of the invention and/or principles involved. As is readily apparent to one of skill in the art having knowledge of the present disclosure, apparatuses, parallel flow contacting trays, or fluid distribution systems according to various other embodiments of the invention will have configurations and components determined, in part, by their specific use.

DETAILED DESCRIPTION

Aspects of the invention are therefore associated with the discovery of systems for the effective distribution of fluid to fractionation trays and especially parallel flow trays comprising multiple contacting deck zones. The fluid distribution systems can advantageously provide liquid to each contacting deck zone in proportion to its area. Moreover, one or more extended troughs having outlet spouts in particular locations (or spout zones) are aligned with liquid distribution pans extending over inlet areas of each deck zone to distribute liquid from the troughs evenly across these areas. The liquid distribution pans can extend perpendicularly to the troughs from which they are fed and parallel to liquid downcomers of the parallel tray contacting stage to which liquid is provided. The number of outlet spouts of each trough will therefore generally be at least equal to the number of distribution pans with which the trough is in fluid communication (i.e., to which the trough distributes fluid). Often, however, a plurality of spouts are used in each vertically aligned region (or spout zone) of distribution from a trough to a distribution pan. The outlet spouts may be slotted or otherwise have any suitable cross-sectional shape, for example, a circle, rectangle (e.g., square), oval, or polygon. Combinations of different shapes are possible. The outlet spouts are generally located on the bottom of the trough, for example, on a bottom surface or face, but they may also be located on one side, or on opposite sides, of the trough.

The distribution systems may also comprise pre-distribution piping in fluid communication with both an inlet external to the apparatus and the at least one extended trough. Pre-distribution piping is normally used to distribute a fluid, such as a liquid feed stream (e.g., from an external inlet to the vapor-liquid contacting apparatus), to the trough or, more commonly, plurality of troughs. Pre-distribution piping may also be integral (e.g., formed as one piece) with troughs, or even absent, such that liquid from an external inlet is distributed directly into troughs and then to liquid distribution pans.

One representative fluid distribution system comprises pre-distribution piping in communication with both an external fluid inlet to the apparatus and having an "H" form with two extended troughs, each having a plurality of outlet spouts. The two branches of the pre-distribution piping and the two troughs in this embodiment extend perpendicularly to liquid downcomers of the parallel tray contacting stage. Each trough receives a substantially equal amount of liquid from the pre-distribution piping through the top, open or partially open areas of the trough. For a parallel tray contacting stage having contacting deck zones of equal area, substantially equal amounts of liquid are distributed to each of these zones by aligning outlet spouts (or spout zones) of the troughs with separate liquid distribution pans, with the total open spout areas to each distribution pan being equal. For example, each of two troughs may have two separate zones of outlet spouts (with each zone comprising one or more individual spouts) for delivering liquid to four separate liquid distribution pans extending over four inlet areas of corresponding contacting deck zones.

Thus, the liquid distribution pans are installed under, and in alignment with, the outlet spouts of the troughs. The outlet spouts are normally concentrated in discrete spout zones which provide fluid to each liquid distribution pan, usually extending in an orthogonal relationship to the troughs, in amounts proportionate to the open area of each spout zone. The liquid distribution pans are generally installed a relatively short distance, for example in the range from about 0.5 inches to about 6 inches, above the perforated vapor-liquid contacting deck zones such that the deck areas immediately below the liquid distribution pans are active for vapor-liquid contacting. The liquid distribution pans also advantageously act as momentum dampers with respect to liquid flowing from the troughs above to minimize or prevent downflowing liquid from penetrating through the perforated contacting deck zones directly underneath. Additionally, the distribution pans can provide a liquid flow path that is deflected away from vertically adjacent liquid downcomers of the parallel flow tray, thereby preventing liquid from bypassing the tray without passing over the vapor-liquid contacting deck zone. The use of imperforate, angled sides of the liquid distribution pans can assist in providing the desired flow path. Also, a relatively shallow liquid distribution pan reduces the space required for the fluid distribution system, as opposed to using other structures, for example extended "false downcomers" for flowing liquid from the distribution pans to the contacting deck zones.

The distribution systems and associated methods can be used in conjunction with various tray configurations, including parallel flow trays having four or more (e.g., from 4 to 16) vapor-liquid contacting deck zones and one or more (e.g., from 1 to 6) middle or central downcomers on each tray. For large columns, the fluid distribution system can comprise two or more (e.g., from 2 to 8) pipe branches and associated troughs. Troughs may be connected via communication channels or tunnels that provide liquid equalization.

Embodiments of the invention are therefore directed to fluid distribution systems, and especially fluid distribution systems, that can effectively distribute fluids to a number of areas simultaneously and in proportions effective for improving or optimizing the overall performance of a vapor-liquid contacting apparatus (e.g., a distillation or fractionation column employing parallel flow trays with multiple vapor-liquid contacting deck zones). Representative distribution systems comprise at least one extended trough having a plurality of outlet spouts and a plurality of distribution pans, with such systems being incorporated into apparatuses for performing parallel flow contacting. The systems are applicable for distributing liquid to a parallel flow tray contacting stage, in which the tray has two or more vapor-liquid contacting deck zones of horizontal liquid flow. A plurality of liquid downcomers extend below the contacting deck zones to inclined downcomer baffles. Also, a central baffle extends above the contacting deck zones and between (e.g., perpendicularly) at least two of the downcomers, normally arranged in parallel. The central baffles and liquid downcomers (both central and side downcomers) define the zones of horizontal flow.

The fluid distribution system, according to some embodiments, may be positioned above all of the contacting stages in a vapor-liquid contacting apparatus, for example, above (i) all of the high capacity, high efficiency parallel flow contacting stages comprising parallel flow trays, (ii) all of the conventional (e.g., tray) contacting stages, or (iii) all of both of these types of stages. The fluid distribution systems are therefore applicable in a number of positions about the length of the apparatus and they may deliver a fluid, for example, to a top contacting stage (above all other contacting stages). A representative fluid in this case is an overhead reflux stream that is returned to a distillation column, which may utilize parallel flow trays. Otherwise, the fluid distribution systems may be positioned between contacting stages, meaning below an upper contacting stage that is above, for example, a middle feed inlet, with the inlet being above the contacting stage to which the distribution system provides the middle feed stream, or at least a liquid fraction of this stream when it comprises both liquid and vapor fractions. In the case of a middle feed between contacting stages, inclined downcomer baffles of the upper contacting stage (e.g., comprising an upper parallel flow tray) may be arranged to direct liquid into the distribution pans of the fluid distribution system. Also, the contacting stages above and below the feed inlet will in many cases handle smaller and larger liquid flows, respectively. Therefore, it will often be desired to use fewer liquid downcomers in the upper contacting stage, above the feed inlet, relative to the contacting stage to which the middle feed (or a liquid fraction thereof) is distributed.

In general, when the fluid distribution system is in fluid communication, optionally through pre-distribution piping, with an external feed inlet to a central region in the vapor-liquid contacting apparatus, an upper contacting stage may be superior to or above both the feed inlet and the fluid distribution system, while the contacting stage to which liquid is distributed may be inferior to or below both the feed inlet and the fluid distribution system. In this case, the contacting stage above or superior to the fluid distribution system may have inclined downcomer baffles that directly feed (i.e., are in liquid communication with) inlet areas of vapor-liquid contacting deck of the contacting stage to which the fluid distribution system distributes liquid. Otherwise, this superior contacting stage may have liquid downcomer baffles in fluid communication with the trough(s) or liquid distribution pans of the fluid distribution system. To accommodate the fluid distribution system, the inclined downcomer baffles extending from the superior contacting stage may have cut out portions with lips or other deflecting features to direct liquid flow from the superior contacting stage to the distribution pan.

In some cases involving fluid (e.g., middle feed) distribution between contacting stages, the number of downcomers of the upper contacting stage may be different from (e.g., less than) that of tie contacting stage below the fluid distribution system. Therefore, another distribution system, for example a chimney tray with vapor risers, may be desired for collecting liquid from the upper contacting stage and distributing it to the one or more troughs of the liquid distribution system. As discussed above, the liquid distribution system, in turn, distributes liquid from these troughs, now containing both liquid from the upper contacting stage and middle feed (or other feed introduced into the apparatus), to the parallel flow contacting stage immediately below.

Representative embodiments of the invention are therefore directed to apparatuses for vapor-liquid contacting comprising a fluid distribution system in combination with a high capacity, high efficiency contacting stage comprising a parallel flow tray. Other embodiments are directed to fluid distribution systems comprising one or more extended troughs having a plurality of spouts aligned for distribution into a plurality of liquid distribution pans, which may extend perpendicularly to the trough(s). In order to increase liquid handling capacity or improve flow management, liquid distribution pans or other flow directing elements may be used to lead liquid from the outlet spouts of the troughs to the vapor-liquid contact decking zones of a contacting stage immediately below the troughs. According to one embodiment, each trough may be integral with a liquid distribution pan or other flow directing element (e.g., the trough(s) may be formed as one piece or may be welded, bolted, banded, or otherwise fastened or affixed (e.g., in a sealing manner) to the pans). According to an alternative embodiment, the trough may feed or be in liquid communication with one or a plurality of liquid distribution pans without being physically attached. For example, an outlet spout, or plurality of outlet spouts, of the trough may be proximate one or more liquid distribution pans in order to discharge liquid therein (e.g., from above the pans or from within the pans, for example, in the case where the trough has an outlet spout inside the inlet of a pan).

In any of the embodiments described above, the outlet spouts of the fluid distribution system trough(s) are aligned for distribution to the distribution pans, which may extend perpendicularly to the trough(s). The distribution pans, in turn, may extend parallel to the liquid downcomers of the parallel tray contacting stage to which fluid is delivered. According to representative embodiments, the number of liquid downcomers is less than the number of distribution pans but greater than the number of troughs of the fluid distribution system. For example, outlet spouts of two troughs may align with (or feed liquid to) a total of four distribution pans, with each trough being in communication with two pans. The associated, parallel flow contacting stage immediately below, in this case, will normally have three liquid downcomers, for example a central liquid downcomer and two side liquid downcomers. Four contacting deck zones of horizontal flow are defined between the liquid downcomers and a central baffle extending perpendicularly to, and between (e.g., at the midpoints of), the liquid downcomers. Openings in each of the distribution pans are dispersed about inlet areas of each of the contacting deck areas. The central baffle therefore serves to define two separate flow regions in which liquid flows in opposite directions. Each of these two flow regions is, in turn, divided into two separate contacting deck zones.

Further embodiments of the invention relate to methods for contacting vapor and liquid streams comprising contacting these streams on a parallel flow tray of an apparatus comprising both a fluid distribution system and a parallel flow contacting stage to which the system provides liquid, as described herein.

FIG. 1 illustrates a high efficiency, high capacity vapor-liquid contacting apparatus, comprising stages within a vessel 10. The vessel 10 includes an outer shell that typically has a cylindrical cross section. The vessel 10 may be, for example, a distillation column, absorber, direct contact heat exchanger, or other vessel used to conduct vapor-liquid contacting. The vessel 10 comprises contacting stages in the form of a parallel flow trays 16, with superior, intermediate, and inferior contacting stages being shown from top to bottom. A fractionation or distillation column typically contains from about 10 to about 250 or more of such contacting stages. The design of contacting parallel flow trays 16 of the column stages may be essentially uniform throughout the column, but it may also vary, for example, to accommodate changes in fluid flow rates in different parts of the column. For simplicity, only three contacting stages are shown in FIG. 1. It is understood that an apparatus such as a distillation column may contain several sections, with each section having numerous contacting stages. Also, there may be a plurality of fluid feed introductions and/or fluid product withdrawals between and/or within sections. Conventional contacting devices (e.g., trays and/or packings) used in distillation may be mixed in the same and/or different sections of the apparatus (e.g., above and/or below), as the sections having contacting stages described herein.

The vessel 10 includes a cylindrical inner chamber 1, a top section 12, a bottom section 14, and a plurality of parallel flow trays 16 having a circular perimeter. The top section 12 collects vapor from the chamber 11 and supplies liquid to the chamber 11. The bottom section 14 collects liquid from the chamber 11 and supplies vapor to the chamber 11. The vessel 10 may also include one or more top, intermediate, and/or bottom feed or withdrawal lines that adds or withdraws a liquid, vapor, or vapor-liquid mixture to or from the vessel 10. Each parallel flow tray 16 of a contacting stage comprises a plurality of vapor-liquid contacting deck zones 18, at least one liquid downcomer 20, and at least two inclined liquid downcomer baffles 22.

Figure 2:
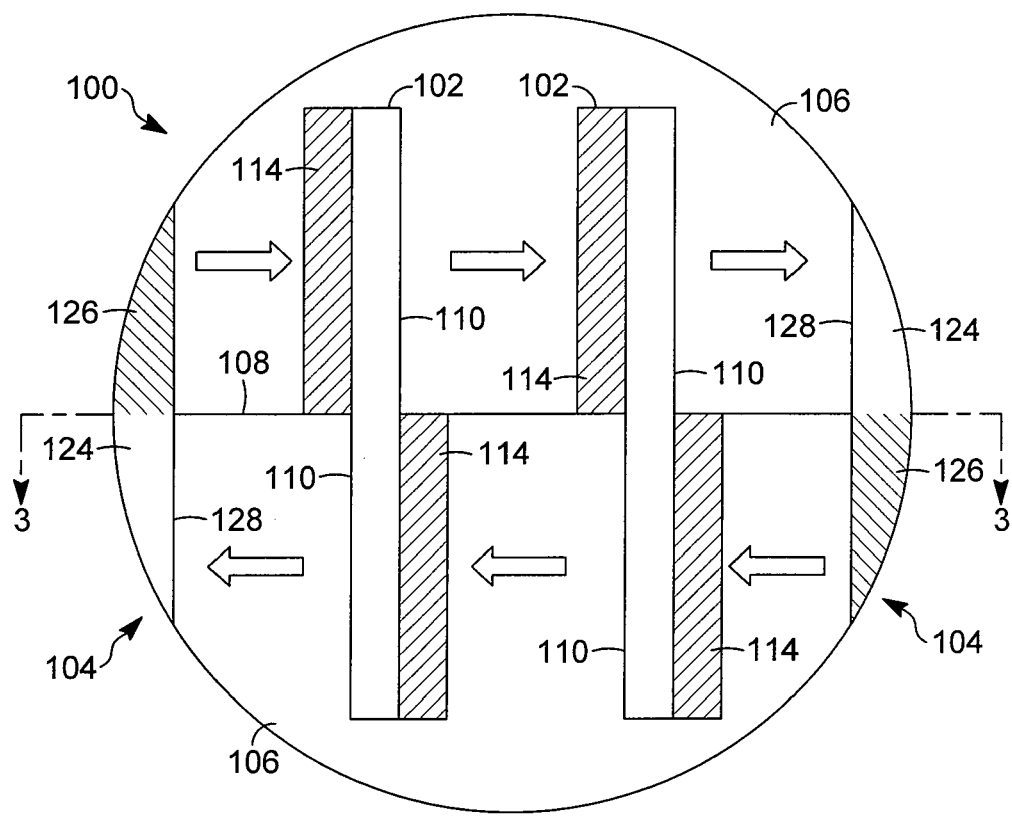
FIG. 2 is a top view of a parallel flow contacting tray.
Figure 3:
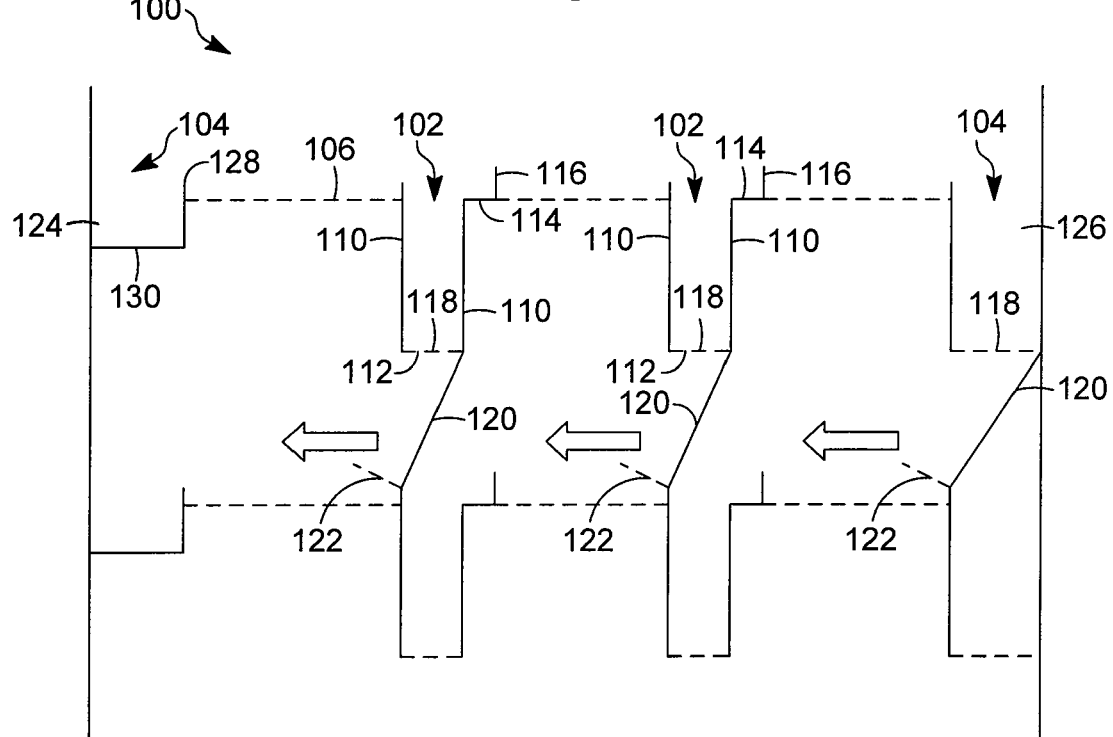
FIG. 3 is a cross-sectional schematic of an apparatus comprising the parallel flow contacting tray of FIG. 2.

A particular contacting tray 100 shown in FIGS. 2 and 3 includes at least one central downcomer 102 and two side downcomers 104. Between each two downcomers 102, 104, each tray 100 includes active areas, or vapor-liquid contacting deck zones 106 in the form of perforated decks. Central baffle 108 extends above the contacting deck zones 106 of tray 100 and divides tray 100 into two flow regions in which liquid flows in opposite directions, as shown by arrows in FIG. 2. Central baffle 108, together with liquid downcomers 102, 104 therefore defines a total of six vapor-liquid contacting deck zones 106 of horizontal liquid flow, in the embodiment shown in FIGS. 2 and 3. Central baffle 108 may be a straight baffle, as shown in FIG. 2, or may have swept-back portions at both sides or have other geometries.

A plurality of liquid downcomers of each tray 100 extend below the contacting deck zones 106 to inclined downcomer baffles 120. Central downcomers 102 includes side walls 110, a bottom plate 112, stilling decks 114, and inlet weirs 116. The flat, horizontal bottom plate 112 extends between the side walls 110. A number of openings 118 are provided in the bottom plate for the exit of liquid which accumulates within central downcomers 102. The purpose of the bottom plates 112 is to retard the liquid flow sufficiently that the bottoms of central downcomers 102 are dynamically sealed by liquid to the upward passage of vapor. The openings may be circular, square or elongated in either direction, that is, along the width or length of central downcomers 102. The sealing of liquid downcomer outlets to upward vapor flow could be accomplished by other structures as well. Stilling decks 114 are imperforate, and thus inactive, regions just prior to the inlets of each central downcomer 102. The combination of inlet weir 116 and stilling deck 114 helps prevent pinching by providing an area near the inlet of the central downcomer 102 that does not add vapor to the froth.

The central downcomers 102 may be supported by any conventional means such as a support ring, not shown, which is welded to the inner surface of the column wall. The contacting deck zones 106 may be supported, for example, by an angle-iron support welded to the side walls 110 and the support ring welded to the column wall. Central downcomers 102 and contacting deck zones 106 are bolted, clamped, or otherwise affixed to the supports so that central downcomers 102 and contacting deck zones 106 are kept in position during operation. The central downcomers 102 may act as the main supports for the tray 100, but additional support beams may be required for substantially large trays. Further, strengthened central downcomers may be used.

An inclined liquid downcomer baffle 120 is situated between the bottom of a central downcomer 102 and the top of a central downcomer 102 immediately below it. It may be seen that the inclined liquid downcomer baffles 120 extend between the central downcomers 102 in such a manner that liquid may not travel horizontally over the central downcomer 102 from one vapor-liquid contacting deck zone 106 to another. Liquid descending from one central downcomer 102 is prevented from falling into the next lower central downcomer 102 and must flow horizontally across contacting deck zones 106 to a different liquid downcomer, either a side downcomer 104 or central downcomer 102, as shown in FIG. 3. Inclined downcomer baffles 120 therefore define a liquid flow path such that liquid falling through the downcomers 102, 104 must flow across a vapor-liquid contacting deck zone 106 of an immediately lower parallel tray contacting stage to a different downcomer that is not vertically adjacent.

In the embodiment depicted in FIGS. 2 and 3, two inclined baffles 120 cover the inlet of each central downcomer 102, with these baffles 120 delivering liquid flowing in opposite directions in each of the two flow regions on either side of central baffle 108. These inclined liquid downcomer baffles 120 have opposite slopes that deliver liquid onto contacting deck zones 106 on different sides of central downcomers 102 such that the liquid flows in the direction of the arrows shown in FIG. 2. In this embodiment the inclined baffles 120 on one side of the tray 100 (i.e., in one flow region) all slope in the same direction, and the inclined baffles 120 on the other side (in the other flow region) slope in the opposite direction. Liquid therefore flows in the opposite directions on the two sides of any one tray 100, but flows in the same direction (parallel flow) on all contacting deck zones 106 in one flow region of each tray 100, as defined by central baffle 108. A perforated anti-penetration or distribution weir 122 may be situated at the bottom of each of the inclined baffles 120. The distribution weir 122 may be inclined for 0 to 90 degrees, preferably about 45 degrees, to horizontal.

The side downcomers 104 are provided to improve the fluid handling at the sides of the tray 100. Each of the side downcomers 104 includes a receiving portion 124 and a distribution portion 126. The receiving portion 124 includes a side weir 128 and an imperforate, sloped bottom plate 130, which is oriented to direct liquid towards the distribution portion 126. The distribution portion 126 includes a bottom plate 112 as described above with the central downcomers 102. An inclined baffle 120 and distribution weir 122 are situated below the distribution portion 126.

The contacting deck zones 106 are perforated to allow vapor to flow therethrough and contact liquid flowing across contacting deck zones 106. The perforations may take many forms including evenly spaced, circular holes and a number of vapor-directing slots. The slots are oriented such that the vapor rising upward through the contacting deck zones 106 through these slots imparts a horizontal thrust or momentum to the liquid or froth on the tray 100 in the direction of the nearest liquid downcomer. There is therefore achieved a more rapid passage of the froth into the liquid downcomer and a decrease in the froth height on the tray. More importantly, by proper slot arrangement, liquid flows uniformly across contacting deck zones 106 into their associated downcomers. In alternative embodiments, perforations may accommodate vapor risers.

In particular, it is preferable that (1) the amount of liquid received by a given contacting deck zone of a parallel flow contacting stage is proportional to its area, and also (2) the liquid received by each liquid distribution pan is distributed evenly about an inlet area of each contacting deck zone. These requirements may be substantially or completely fulfilled using fluid distribution systems in which one or more extended troughs, optionally having pre-distribution piping from the liquid source external to the apparatus to the trough (s), are used to provide liquid to liquid distribution pans from a plurality of outlet spouts, with the liquid distribution pans extending laterally over inlet areas of the contacting deck zones. The requirement (1) above may be satisfied by varying the outlet spout (or liquid exit) areas of a trough in locations in which the trough is aligned or communicates with a liquid distribution pan. The requirement (2) may be satisfied by extending the liquid distribution pans, as well as dispersing openings from the bottoms of these pans, over appropriate inlet areas of the contacting deck zones.

Figure 4A:
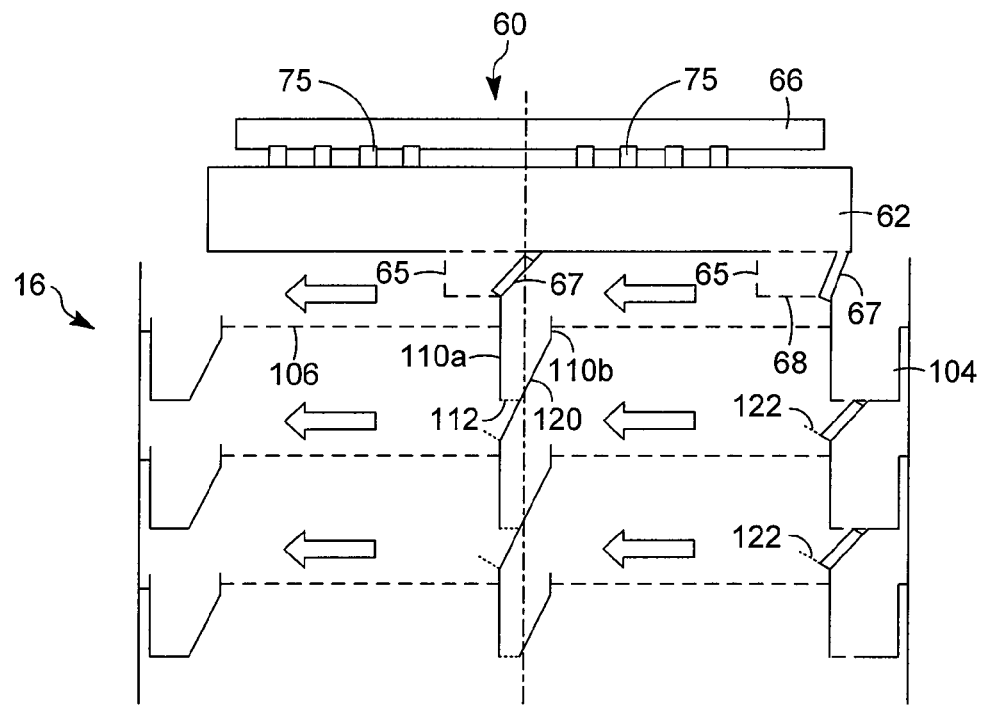
FIGS. 4A and 4B are cross-sectional and top views, respectively, of a representative apparatus comprising a fluid distribution system positioned above all contacting stages in the apparatus.
Figure 4B:
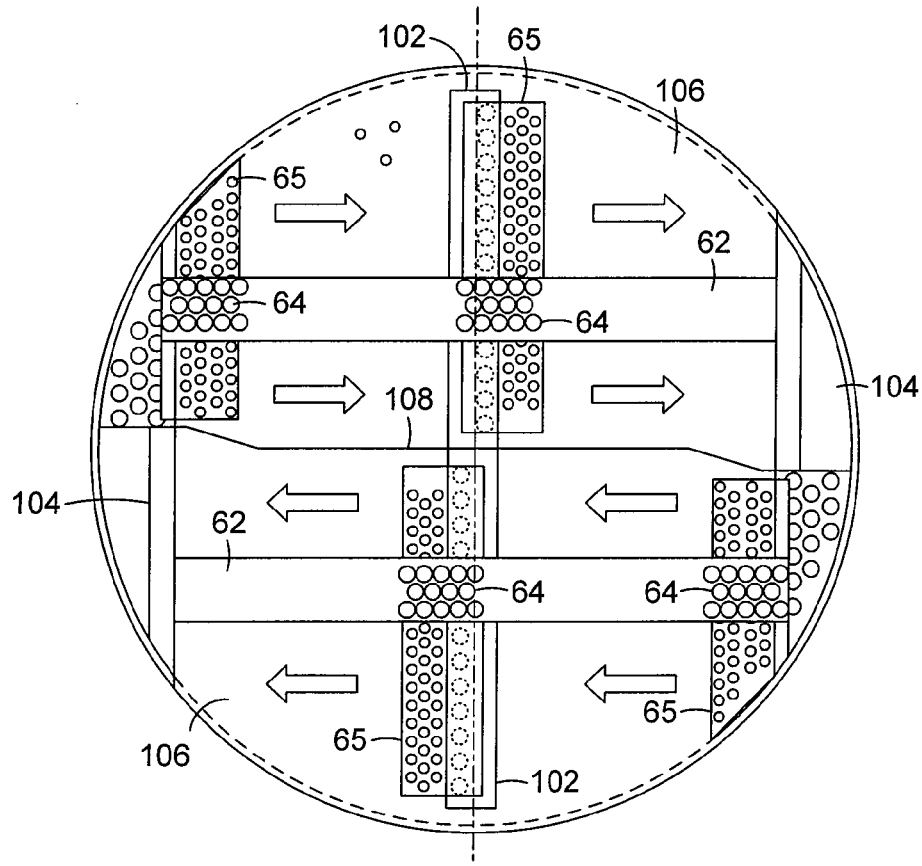

FIGS. 4A and 4B illustrate a top section of a vapor-liquid contacting apparatus having a top parallel flow tray 16 to which fluid is provided by fluid distribution system 60 having two troughs 62 extending horizontally across a substantial portion of the vessel cross section. Each of the two extended troughs 62 has a plurality of outlet spouts 64 for delivering a desired proportion of liquid, such as from a liquid feed stream from an external inlet of the apparatus, to each of four liquid distribution pans 65 inferior to or below the troughs 62. Parallel flow tray 16 of a contacting stage may be a top or uppermost contacting stage of a vessel, such that fluid distribution system 60 is positioned above all of the contacting stages of the apparatus. The fluid distribution system 60 also has associated pre-distribution piping 66, which in this case may be an "H" pipe distributor with side pipes communicating with each trough 62 of the two-trough fluid distribution system. In the case of large vapor-liquid contacting apparatuses (e.g., distillation columns), more than two troughs and two branches of pipe distributor may be used. Alternatively, an additional horizontal layer of trough distribution, with more than two troughs, may be included below the two-trough fluid distribution system shown in FIGS. 4A and 4B to further improve liquid distribution. As is illustrated in FIG. 4B, troughs 62 extend orthogonally or perpendicular with respect to liquid distribution pans 65, such that each trough 62 is separately in fluid communication, through outlet spouts 64, with all of the vapor-liquid contacting deck zones 106 of parallel flow tray 16 below.

In the embodiment illustrated in FIGS. 4A and 4B, central baffle 108 is not straight but instead has swept back ends to increase the entrance space of side downcomer 104, thereby increasing its capacity and reducing choking tendency. The capacity of side downcomer 104 may be increased such that it is substantially equal to that of central downcomers 102. Also illustrated in FIG. 4A is the use of first side wall 110a and opposing second side wall 110b to form central downcomers 102. The second side wall 110b extends a shorter vertical distance below contacting deck zone 106 than the first side wall 110a, with the bottom plate 112 extending horizontally from a bottom end of the first side wall 110a. Furthermore, the inclined liquid downcomer baffles 120 extend from the second side wall 110b at least to a vertical plane formed by the first side wall 110a. Using the extended inclined liquid downcomer baffle 120, the pinch on fluid flow into the central downcomer 102 is reduced, without the use of stilling deck 114 as shown in FIGS. 2 and 3.

Thus, outlet spouts 64 at or near the bottom of troughs 62 are open to areas that intersect or are in vertical alignment with liquid distribution pans 65. If desired, for example in the case where the intersected or vertically aligned areas are insufficient for a specified flow rate of liquid to be distributed from the troughs to a liquid distribution pan, these vertically aligned distribution or transfer areas can be increased by increasing the width of the troughs 62. Angled, imperforate sides 67 of distribution pans 65 provide a flow path for liquid falling through distribution pan openings 68 such that this liquid is deflected from the immediately, vertically adjacent liquid downcomer 102, 104 of the parallel flow tray 16 and must instead flow across vapor-liquid contacting deck zones 106 to respective, different downcomers 102, 104 that are not vertically adjacent. Openings 68 in liquid distribution pans 65 also extend, preferably evenly, over desired inlet areas of the contacting deck zones 106. These inlet areas may occupy, for example, an initial portion of the length of the contacting deck zone 106, with the length dimension being in the normal direction of liquid flow. This initial portion may extend, for example, from about 0% to about 40% (i.e., the initial 40%), from about 0% to about 30%, and often from about 0% to about 20%, of the length of the deck zone.

Figure 5A:
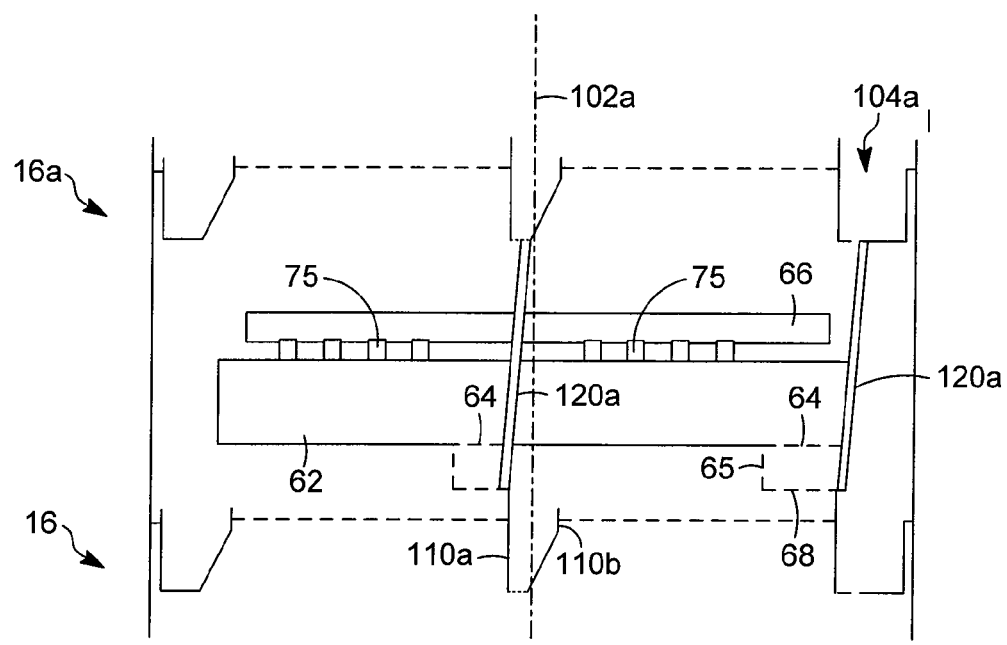
FIGS. 5A and 5B are cross-sectional and top views, respectively, of a representative apparatus comprising a fluid distribution system positioned below an upper contacting stage.
Figure 5B:
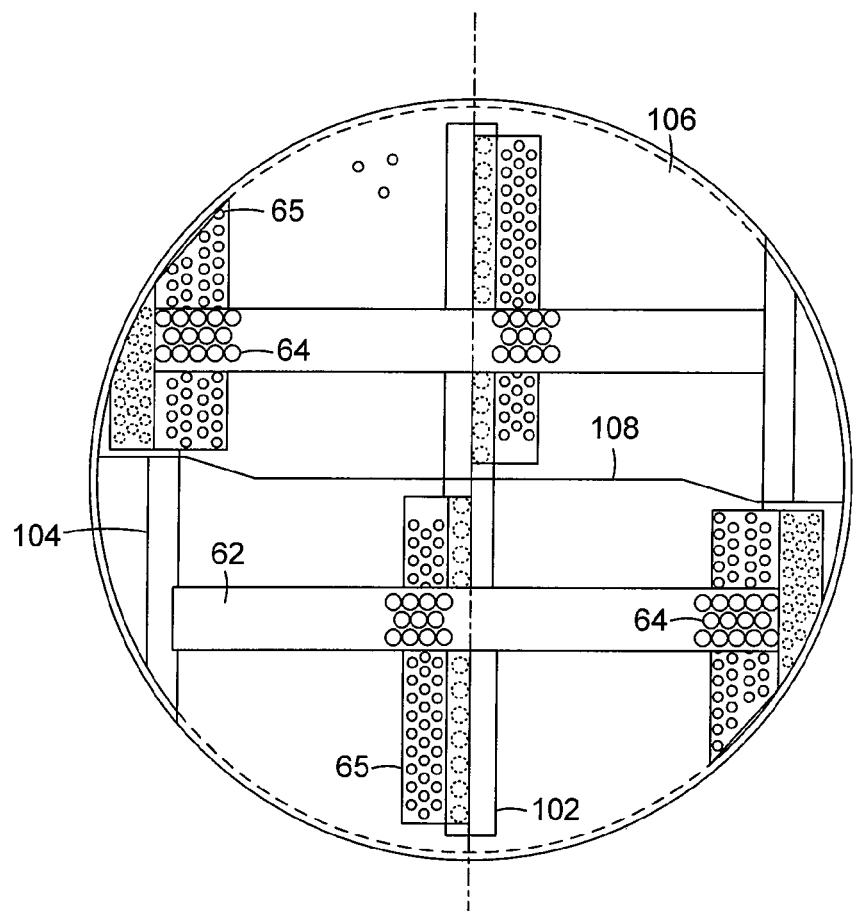

FIGS. 5A and 5B illustrate the use of a fluid distribution system for the introduction of a middle feed below upper parallel flow tray 16a of an upper contacting stage and parallel flow tray 16 of a contacting stage immediately below, to which liquid is distributed. A middle feed inlet to the column may therefore be between these contacting stages and in communication with pre-distribution piping 66 having piping outlets 75 to troughs 62 of the fluid distribution system. Inclined downcomer baffles 120a of upper contacting stage can have cut out sections to allow insertion and positioning of the fluid distribution system. Deflecting features such as lips may be installed around the cut-outs of these upper contacting stage baffles 120a to prevent the liquid from falling into the troughs 62 and to direct liquid into the liquid distribution pans 65.

Figure 6A:
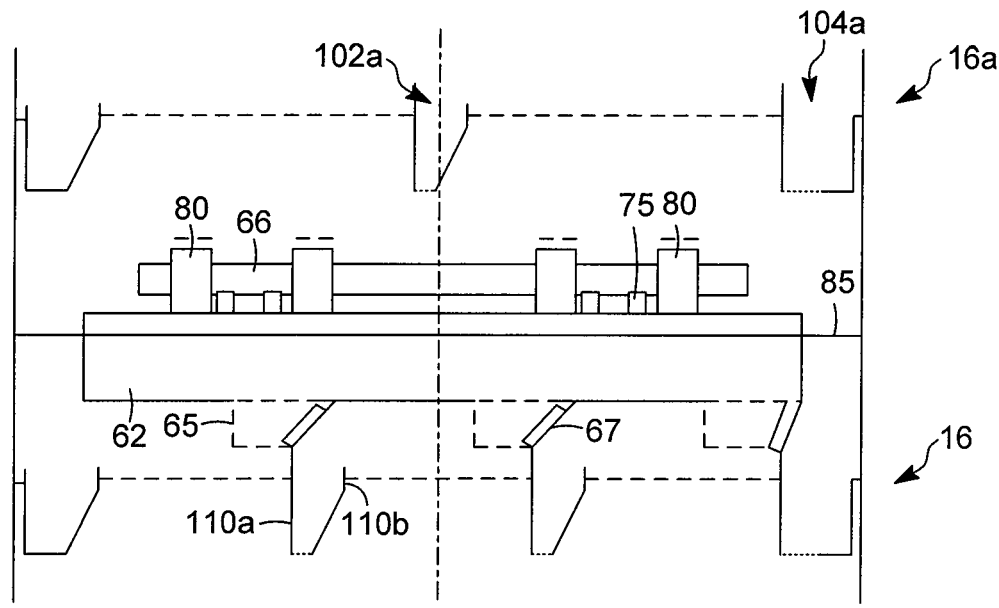
FIGS. 6A and 6B are cross-sectional and top views, respectively, of a representative apparatus comprising a fluid distribution system that is used in combination with a chimney tray.
Figure 6B:
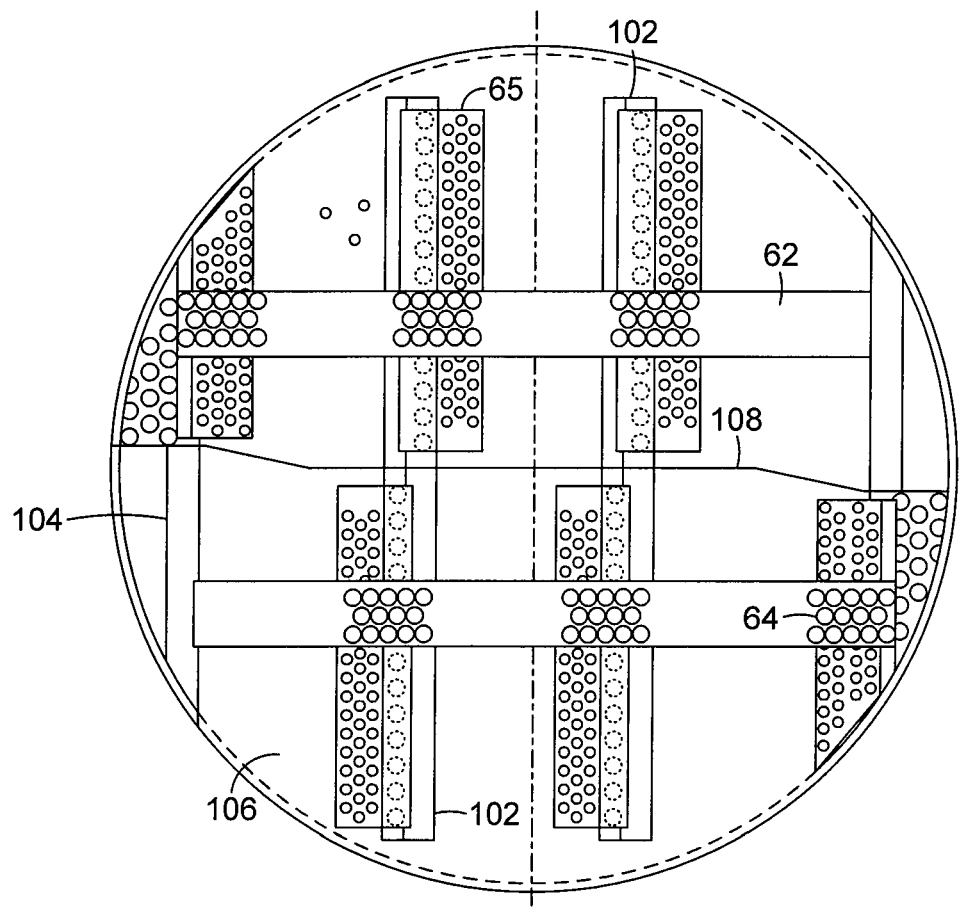

FIGS. 6A and 6B illustrate a further embodiment, in which a chimney tray is used for collecting liquid from an upper tray and redistributing the liquid, together with the middle feed, from troughs of the liquid distribution system to the contacting stage below. Chimney trays or other liquid and/or vapor distributors can therefore be used with advantage to distribute a middle feed (which may be partially vaporized) in combination with a liquid internal to the vapor-liquid contacting apparatus, between contacting stages. The internal liquid that is combined with the middle feed in the liquid distribution trough will therefore have a composition representative of liquid of the upper contacting stage. Advantageously, the chimney trays also serve the purpose of distributing upwardly flowing vapor through the vapor risers of the tray. Chimney trays or other supplemental distribution devices are especially applicable in cases, as shown in FIGS. 6A and 6B, in which contacting stages comprising parallel flow trays 16a, 16 above and below the feed have different numbers of downcomers. An added distribution device is therefore desirable for effectively collecting and distributing all liquids (both internal and externally added) between the contacting stages. This chimney tray or other distribution device, in combination with the fluid distribution system, can also be used for fluid withdrawal from the vessel such as a distillation column. As shown in FIG. 6A, the extended troughs 62 are located below and fed by a liquid collection deck 85 having a plurality of vapor risers 80. In the embodiment shown, upper parallel flow tray 16a has fewer downcomers 102a, 104a than parallel flow tray 16 to which liquid is distributed from fluid distribution system 60. That is, parallel flow tray 16 has an additional central downcomer 102 for a total of four, which may be necessary, for example, to handle the additional liquid provided with fluid distribution system 60, or may be desirable for other reasons. Liquid collection deck 85 may therefore function as a chimney tray having vapor risers, and direct liquid to distribution troughs 62 which in turn distribute liquid to distribution pans 65 below troughs 62. The configuration of pre-distribution piping 66 for a middle feed above liquid collection deck 85 will depend on a number of factors, including the feed rate, feed vapor fraction, and overall vessel size. The pre-distribution piping 66 can feed fluid to the liquid collection deck 85 or the extended trough 62. The number of braches of piping 66 can be same as or fewer than the number of the extended troughs.

Overall, aspects of the invention are directed to the use of fluid distribution systems for high capacity, high efficiency contacting, and particular in conjunction with parallel flow trays. Those having skill in the art will recognize the advantages of the equipment and associated methods described herein and their suitability in other applications. In view of the present disclosure, it will be appreciated that other advantageous results may be obtained. Those having skill in the art, with the knowledge gained from the present disclosure, will recognize that various changes can be made in the above equipment and methods without departing from the scope of the present disclosure. Mechanisms used to explain theoretical or observed phenomena or results, shall be interpreted as illustrative only and not limiting in any way the scope of the appended claims.

The invention claimed is:

1. An apparatus for performing parallel flow contacting comprising:
   a) a fluid distribution system comprising at least one extended trough having a plurality of outlet spouts and a plurality of liquid distribution pans; and
   b) a parallel flow tray contacting stage having a plurality of vapor-liquid contacting deck zones of horizontal liquid flow,
   c) a plurality of downcomers extending below the contacting deck zones to inclined downcomer baffles, and
   d) a central baffle extending above the contacting deck zones and between at least two of the plurality of downcomers and defining, with the downcomers, the zones of horizontal flow,
   wherein the outlet spouts are aligned with the liquid distribution pans, and wherein the liquid distribution pans extend over inlet areas of the vapor-liquid contacting deck zones.

2. The apparatus of claim 1, wherein central downcomers of the plurality of downcomers are formed by a first side wall and an opposing second side wall extending a shorter vertical distance below the contacting deck zones and comprises a bottom plate extending horizontally from a bottom end of the first side wall.

3. The apparatus of claim 2, wherein each inclined downcomer baffle extends from the second side wall at least to a vertical plane formed by the first side wall.

4. The apparatus of claim 1, wherein the liquid distribution pans extend perpendicularly to the at least one extended trough.

5. The apparatus of claim 1, wherein the liquid distribution pans extend parallel to the plurality of downcomers of the parallel tray contacting stage.

6. The apparatus of claim 1, wherein the number of troughs of the fluid distribution system is less than the number of downcomers of the contacting stage.

7. The apparatus of claim 1, wherein number of liquid distribution pans is greater than the number of downcomers of the contacting stage.

8. The apparatus of claim 1, wherein the liquid distribution pans have a plurality of openings dispersed about the inlet areas of each of the vapor-liquid contacting deck zones.

9. The apparatus of claim 1, wherein the fluid distribution system further comprises pre-distribution piping to distribute a feed stream to the troughs.

10. The apparatus of claim 1, wherein the number of troughs is two, the number of downcomers is three, and the number of liquid distribution pans is four.

11. The apparatus of claim 1, wherein angled sides of the liquid distribution pans provide a liquid flow path that is deflected away from vertically adjacent downcomers of the plurality of downcomers.

12. The apparatus of claim 1, wherein the fluid distribution system is positioned above all contacting stages in the apparatus.

13. The apparatus of claim 1, wherein the fluid distribution system is positioned below an upper contacting stage in the apparatus.

14. The apparatus of claim 13, wherein the upper contacting stage is above a feed inlet to the apparatus and the contacting stage is below the feed inlet.

15. The apparatus of claim 13, wherein the upper contacting stage comprises a plurality of upper contacting stage inclined downcomer baffles arranged to direct liquid into the liquid distribution pans.

16. The apparatus of claim 13, wherein the upper contacting stage has fewer downcomers than the parallel flow contacting stage.

17. The apparatus of claim 13, wherein the at least one extended trough is below a liquid collection deck having a plurality of vapor risers.

18. An apparatus for performing co-current vapor-liquid contacting, comprising:
   a fluid distribution system comprising pre-distribution piping in communication with both an external fluid inlet to the apparatus and at least one extended trough having a plurality of outlet spouts and a plurality of liquid distribution pans,
   wherein the distribution system is above a parallel flow tray contacting stage having a plurality of vapor-liquid contacting deck zones of horizontal liquid flow, a plurality of downcomers extending below the contacting decks to inclined downcomer baffles, a central baffle extending above the contacting decks and between at least two of the plurality of downcomers and defining, with the downcomers, the zones of horizontal flow, and
   wherein the outlet spouts are aligned with the liquid distribution pans, which provide a liquid flow path that is deflected away from vertically adjacent downcomers of the plurality of downcomers.

19. The apparatus of claim 18 wherein the liquid distribution pans extend perpendicularly to the at least one extended trough.

* * * * *